US008630792B2

(12) United States Patent
Smith

(10) Patent No.: US 8,630,792 B2
(45) Date of Patent: Jan. 14, 2014

(54) VEHICLE FUEL COST-PER-TIME DISPLAY

(76) Inventor: David B. Smith, Monroe, MI (US)

( * ) Notice: Subject to any disclaimer, the term of this patent is extended or adjusted under 35 U.S.C. 154(b) by 0 days.

(21) Appl. No.: 13/462,493

(22) Filed: May 2, 2012

(65) Prior Publication Data

US 2012/0283940 A1 Nov. 8, 2012

Related U.S. Application Data

(60) Provisional application No. 61/518,178, filed on May 2, 2011.

(51) Int. Cl.
*G06F 19/00* (2011.01)

(52) U.S. Cl.
USPC ........ 701/123; 701/51; 477/5; 477/6; 477/62; 180/65.8; 180/165; 180/179; 705/33; 705/35; 705/40

(58) Field of Classification Search
USPC ........ 701/51, 123; 477/5, 6, 62, 74, 169, 175, 477/176, 181, 901; 180/65.8, 165, 179; 123/323, 325, 327, 454, 587; 903/912, 903/960; 705/33, 35, 40
See application file for complete search history.

(56) References Cited

U.S. PATENT DOCUMENTS

| | | | | |
|---|---|---|---|---|
| 3,983,533 | A | 9/1976 | Goszyk et al. | |
| 4,050,295 | A | 9/1977 | Harvey | |
| 4,287,503 | A | 9/1981 | Sumida | |
| 4,590,568 | A | 5/1986 | Barske et al. | |
| 4,593,357 | A | 6/1986 | Van Ostrand et al. | |
| 4,706,083 | A | 11/1987 | Baatz et al. | |
| 6,411,888 | B1 | 6/2002 | Weisman, II | |
| 6,694,245 | B2 | 2/2004 | Minami et al. | |
| 6,694,806 | B2 | 2/2004 | Kumagai et al. | |
| 6,975,217 | B2 | 12/2005 | Endoh | |
| 6,988,033 | B1 | 1/2006 | Lowrey et al. | |
| 7,072,762 | B2 | 7/2006 | Minami et al. | |
| 7,603,228 | B2 | 10/2009 | Coughlin | |
| 8,190,533 | B2 * | 5/2012 | Dickman | 705/335 |
| 2008/0319605 | A1 * | 12/2008 | Davis | 701/35 |
| 2009/0109022 | A1 * | 4/2009 | Gangopadhyay et al. | 340/540 |
| 2010/0262555 | A1 * | 10/2010 | Dickman | 705/335 |
| 2012/0158609 | A1 * | 6/2012 | Dickman et al. | 705/335 |
| 2012/0239587 | A1 * | 9/2012 | Dickman | 705/332 |
| 2012/0283940 | A1 * | 11/2012 | Smith | 701/123 |

* cited by examiner

*Primary Examiner* — James P. Trammell
*Assistant Examiner* — McDieundel Marc
(74) *Attorney, Agent, or Firm* — Gifford, Krass, Sprinkle, Anderson & Citkowski, P.C.

(57) ABSTRACT

Vehicle operating conditions are computed and the instant variable cost of operation is displayed, enabling operators to learn to operate the vehicle in ways that maximize value, minimize fuel consumption, and reduce or avoid operations that are excessively costly or wasteful. The display quantity is termed "Dynamic Fuel Cost" or DFC, usually measured and displayed in currency (such as Dollars or Euros) per hour. Once every second or so, up to six modes of vehicle operation are detected, including steady speed, acceleration, deceleration by coasting (reduced power or parasitic drag), regenerative braking (in vehicles so equipped such as hybrids), friction braking, and zero speed idling. Then DFC is computed and displayed to the operator. Operators can choose to operate the vehicle in ways that maximize the value of their time and minimize fuel consumption and resulting emissions of pollutants and greenhouse gases.

21 Claims, 10 Drawing Sheets

Acceleration-Steady Speed-Coast-Brake Boundaries

Vehicle Speed Versus Fuel

Dynamic Fuel Cost
4.0
3.0
2.0
1.0
0.0
-1.0
-2.0
DFC (Gal/hr)
0
20
40
60
80
100
120
140
Speed (km/hr)

VEHICLE FUEL COST-PER-TIME DISPLAY

REFERENCE TO RELATED APPLICATION

This application claims priority from U.S. Provisional Patent Application Ser. No. 61/518,178, filed May 2, 2011, the entire content of which is incorporated herein by reference.

FIELD OF THE INVENTION

This invention relates generally to motor vehicles and, in particular, to apparatus and methods that reduce cost, fuel consumption, waste, and the emissions of pollutants and greenhouse gases by displaying the cost of vehicle operation as a function of time.

BACKGROUND OF THE INVENTION

It has long been desirable to reduce cost of operation, fossil fuel consumption, and emissions of pollutants and greenhouse gases from vehicles such as automobiles, buses, trucks, trains, boats and aircraft powered by internal or external combustion engines (ICE and ECE) and other Prime Movers. Over the last two centuries, many inventions have served to improve the fuel consumption of automobiles and trucks and other powered vehicles and save precious fossil fuels. Examples include high-compression engines, multi-speed and overdrive transmissions, aerodynamics, radial tires, electronic fuel injection, electronic engine and powertrain controls, lighter but stronger materials and improved methods of construction. The introduction and commercialization of hybrid vehicles with the capability to store energy through regenerative braking and reuse the same during acceleration have demonstrated some dramatic improvements in fuel mileage.

The total fuel consumed by a vehicle depends on the distance traveled and the basic vehicle design, but is also significantly dependent on how it is operated. Every passenger car and light truck for sale in the US has a window sticker displaying the estimated mileage (miles per gallon) based on standard "Urban" as well as "Highway" test cycles. Driving behaviors and routes also affect mileage, such as payload, speed, rates of acceleration, transmission gear ratios and shifting, rates of deceleration and braking, upgrades and downgrades, cold and warm starts, zero speed idling, etc. As the automobile EPA mileage sticker states, "Your mileage may vary."

While the EPA Mileage Sticker provides useful information to buyers and manufacturers of automobiles, owners have frequently complained that they fail to achieve the posted results in "real world" driving. As a result the EPA has twice revised the calculation procedure to reduce both the Urban and Highway numbers. This may mean that drivers often fail to drive in the more fuel-efficient ways, or that the standard EPA Test Procedures are not representative of a typical trip. Consequently there may exist an opportunity to better inform drivers on ways to save fuel.

Since the early days of the automobile, "experts" have given advice to operators on ways to reduce fuel consumption, and often to the experts' chagrin, such advice is mostly ignored. The most oft-repeated advice to save fuel is to drive and accelerate more slowly. This same advice can be seen today on the EPA and other fuel-conscious Websites. This idea led to the National Speed Limit of 55 mph, enacted by Congress in 1974 following the Arab Oil Embargo, and not repealed until the mid-1990s.

Many devices have been marketed to operators of vehicles with the aim or claim to reduce fuel consumption and cost. Some of these devices actually work. One of perhaps the earliest, most simple and inexpensive devices for automobiles is the intake manifold vacuum gauge. Such devices were introduced decades ago and are still available today from the aftermarket. In use, operators are advised to not operate the engine at low manifold vacuum, i.e. large throttle openings, and the instrument had green, yellow, and red ranges.

The next step in technology was a variety of mechanical devices designed to display to the operator an indication of the fuel consumed per distance traveled, in miles per gallon of fuel, or liters per 100 kilometers, or simply mileage. Patent records reveal variations on such devices from the 1920s or earlier to present day.

Developments in emissions regulations, solid-state electronics, microprocessors, and electronic engine controls have provided additional sensors and means of obtaining speed, fuel flow, and other information from vehicles, and means to compute and display information to operators. For example, displays of actual instantaneous miles per gallon (mileage) or liters per 100 kilometer became available factory installed on many vehicles as well as the aftermarket in the form of "trip computers."

U.S. Pat. No. 3,983,533 to Goszyk et al. used analog electronic devices to produce a MPG display with a warning device. U.S. Pat. No. 4,050,295 to Harvey described a digital electronic measuring system. U.S. Pat. No. 4,287,503 to Sumida provides a "running data central display arrangement for motor vehicles and the like" for abnormal conditions as well as selected running conditions, including "average fuel cost" but fails to define what is meant or how it is calculated. The method and device of Barske in U.S. Pat. No. 4,590,568 determines a rate of fuel consumption and controls the vehicle engine to achieve a desired distance for a given quantity of fuel. U.S. Pat. No. 4,593,357 of Van Ostrand, et al. describes a portable computer based performance monitoring system with an improved fuel flow meter and a display of mileage. U.S. Pat. No. 4,706,083 to Baatz, et al. describes an improved fuel flow meter to determine and display a "performance ratio."

U.S. Pat. No. 6,411,888 to Weisman, II describes a driving efficiency gauge and display, wherein a measure is derived and displayed by a calculation of losses of braking and idling, and calculating the cost of operating a vehicle per unit distance traveled or per unit of time, and an instantaneous braking velocity cost per unit distance. Although these calculations may have merit to individual drivers and fleet operators, it seems abstract and only measures part of the complete driving cycle.

U.S. Pat. No. 6,694,245 to Kinami et al. describes another method to calculate fuel flow based on the measure of air flow and fuel to air ratio. This information is then used to calculate and display measures such as "excess drive force," "reserve drive force," a "hard braking/hard acceleration warning lamp," and average fuel consumption rate. Histograms are also recorded in the data processor. The fuel flow measure may be valid but seems obvious, and the definition or threshold of "excess drive force," "hard braking/acceleration," etc. have to be made by an "expert," which leads to an arbitrary and capricious measure to an operator.

U.S. Pat. No. 6,975,217 to Endoh describes another vehicle fuel mileage meter which displays the mileage after a vehicle has exceeded a predetermined threshold speed. Such information may make good advertising claims for manufacturers, but neglects a significant part of the real world driving experience.

U.S. Pat. No. 6,988,033 to Lowery et al. describes using the vehicle On-Board Diagnostics (OBD) systems, wireless data transmission, and the Internet to determine a vehicle's fuel efficiency. This document describes another system for obtaining vehicle speed, Mass Air Flow (MAF) and/or percent engine load and other data from the OBD port, calculating fuel flow, sending the data over wireless data and/or cell phone systems to the Internet and a host computer. The host computer is used to determine properties of the vehicle such as tire pressure, status of the fuel injection system, etc. The average fuel mileage and amount of money spent on fuel is calculated and relayed back to the vehicle operator. The system may be of benefit to vehicle manufacturers or fleet operators, but does not seem to merit the complexity of the system to a vehicle owner.

U.S. Pat. No. 6,694,806 to Kumagi et al. describes another method to calculate fuel flow based on engine rotation speed and accelerator depression and looking up BSFC on an engine performance map. This information is then used to compute, display, and record fuel mileage over several different operating conditions of the vehicle, i.e. another mileage meter.

U.S. Pat. No. 7,072,762 to Minami et al. describes another evaluation system for vehicles, summarizing fuel consumed during operations that worsen fuel economy such as acceleration. The document fails to describe how best to accelerate a vehicle without consuming more fuel than required at a steady speed, nor the consequences of different rates of acceleration.

U.S. Pat. No. 7,603,228 to Coughlin describes a "haptic" (sense of touch) device to vibrate the accelerator pedal when an aspect of vehicle operation crosses a speed or acceleration threshold. The patent description indicates that a possible message "could include . . . the money saved per hour like a wage being earned through better driving habits," but does not describe how this might be carried out. Several higher cost modes of vehicle operation are described and when thresholds are exceeded the vibration is initiated. As with other referenced devices, the thresholds are set by the expert, whoever that might be, using unknown criteria.

Overall, the prior-art devices fail to provide a true sense of the best way to operate the vehicle during all modes normally encountered, and raise unanswered questions. How does one decide if the current mileage is too high or too low, other than setting an arbitrary limit? During acceleration the manifold vacuum and vehicle fuel mileage can be seen to drop precipitously, but how much is too much? Additional devices have been developed to guide vehicle operators to operate the vehicle in more fuel efficient ways, such as upshift indicators or devices to signal the operator that operation exceeds an arbitrary value. Such devices often become mere annoyances.

The above devices ignore two parameters that are of equal or more importance to the operator; namely, the time to reach a destination and the cost of fuel in currency such as dollars. Most individuals consider their time to be important or of value, which is why they use a vehicle instead of other modes of transportation. Most vehicle operators therefore simply ignore the fuel mileage display and travel at or near or above the maximum safe or legal speed.

During the 1980s and early 1990s, fuel was abundant and prices were relatively low yet the 55 mph speed limit remained and was heavily enforced. As it turns out, however, driving 55 mph saves only a few dollars of fuel per hour of increased travel time. High rates of acceleration reduce travel time, but overall fuel consumption may not be dependent on the rate of acceleration. A few seconds of coasting from slower speeds yields worthwhile savings, but eventually the savings become insignificant at slow speeds. However, even though the savings in fuel and increased time may be small for each event, over many such events of a single trip or a lifetime of driving and the entire vehicle population the savings could become significant and worthwhile doing for most operators. Consequently, an improved way to convey this information to operators of powered vehicles would be of considerable value.

SUMMARY OF THE INVENTION

This invention broadly provides a continuous, instantaneous display of the marginal cost or consumption of fuel per unit of change of travel time at any given speed or operating condition. Such a display, preferably in common engineering or commercial measurements of fuel and time such as gallons or liters per hour, or currency per time such as Dollars or Euros per hour, is called Dynamic Fuel Cost (DFC). In the preferred embodiments, the display is calculated and displayed by the embodiment for at least four modes of operation of conventional vehicles, and an additional mode of regenerative braking for hybrid vehicles.

This display is computed for steady speed operation from a compilation of fuel consumption at steady speed. During acceleration, DFC is computed from the actual fuel consumption compared to steady speed, in relation to the reduced travel time over a specified distance. During coasting, DFC is defined as the Fuel or Cost SAVE by coasting instead of continued travel at an initial speed and then friction braking to current speed, in relation to the additional time required by coasting. Fuel or Cost SAVED in this context is fuel consumption that is avoided simply by closing the throttle or accelerator and allowing the vehicle to coast, recovering the kinetic energy of the vehicle, and avoiding the energy LOST of friction braking. During friction braking, DFC is defined as the Fuel or Cost LOST by continued travel at an initial speed instead of coasting, in relation to the additional time required by coasting to current speed. In other words, Fuel or Cost LOST is fuel that could be Fuel or Cost SAVE had the vehicle operator the foresight to coast instead of using friction brakes.

The instantaneous display of DFC, computed in units relevant to the operator, such as in gallons or liters or kilowatts, or dollars or Euros, per hour, becomes a number that relates to the value of individual's time. Such a number can be compared to wages or other cost or value of time, and be a means for vehicle operators to avoid excessive cost and save fuel in ways that are worth their time. Operators of commercial vehicles may relate such a number to revenue resulting from vehicle operation. Variable cost of operation could also include an expression of the cost or risk of an accident, measured in potential damage to vehicles and property and injury or death to people involved, as a function of the speed of the vehicle. The more informative display enables vehicle operators to make better decisions to consume less fuel, emit fewer pollutants and greenhouse gases, increase the capacity of the roadway system, and enhance individual productivity.

Mathematically, DFC is the first derivative of the fuel flow rate as a function of travel time. The display of DFC provides the answer to the question "If the vehicle is operated one mph or kph faster or slower than currently, what is the cost of fuel?" Alternatively and more straightforwardly, the display can be thought of simply as the cost to operate the vehicle in dollars per hour.

At predetermined time intervals such as once every second, up to six modes of vehicle operation is detected, including steady speed, acceleration, deceleration by coasting (reduced power or parasitic drag), regenerative braking (in vehicles so equipped such as hybrids), friction braking, and zero speed idling. DFC is then computed and displayed to the operator in accordance with the particular mode of current operation.

Vehicle speed and fuel flow are obtained from installed sensors by a microcontroller, either directly or via the vehicle On Board Diagnostics (OBD) bus. A table of fuel flow at a plurality of steady speeds over the operating range of the vehicle is obtained and stored in an electronic memory. After acquiring each new set of steady speed and fuel data, an expression or equation is re-calculated to enable calculating fuel flow at any steady speed of the vehicle. From this data a separate equation is derived to calculate DFC as the ratio of the change in fuel for a small change in travel time at any speed of the vehicle.

When the vehicle is determined by the microprocessor to be at a steady speed, DFC is calculated for the actual steady speed and displayed to the operator. DFC may be displayed in units of dollars or other currency per hour, as might be compared to an individual's wage or Federal Minimum Wage. At speeds above the most fuel-efficient speed of the vehicle, DFC is calculated to be a positive number, and the mode display is blank. At speeds below the most fuel-efficient speed of the vehicle, including zero speed, DFC is calculated to be a negative number. During these conditions the display indicates "L" or "LOSE", indicating that the vehicle is not being operated in a most fuel-efficient way, although such speeds may be necessary for safety or other reasons.

The process of computing and displaying steady-speed DFC may be similar to the methods of industries to dispatch production among multiple facilities. For instance, since the 1960s or earlier, electric utilities have produced data of individual generator production cost versus electric output for the electric generator fleet, and computed the first derivative or slope of each generator's cost versus output curve. The lowest cost generators are then scheduled or dispatched based on individual incremental cost compared to the instant fleet cost (system Lambda). However, since vehicles can both accelerate and decelerate by various methods, calculating DFC for vehicles is a more complex process, as follows.

During acceleration of a vehicle, the Prime Mover(s) must be operated at higher power and higher fuel flow than at steady speed, according to Newton's Laws of Motion (F=MA). This additional fuel yields higher speed which relates to reduced travel time. Consequently, DFC during acceleration is defined as the fuel consumed in excess of steady speed fuel, divided by the reduction in travel time resulting from the increased speed. The reduced travel time is a function of the distance traveled; consequently the distance traveled must be assumed for the calculation. The "payback distance" chosen varies with the square of speed, with acceleration from zero to 70 MPH to have a payback of approximately 2 miles. DFC during acceleration can be seen to be essentially independent of acceleration rate and comparable to steady speed DFC, another unexpected result. A potential benefit to this information may convince operators to accelerate faster from traffic signals, increasing the number of vehicles to pass each Green and increase the overall capability of existing roadways.

Deceleration of a conventional vehicle can be accomplished in several ways; for example, simply "lifting" off the accelerator pedal with the Prime Mover still connected to the drive train, reducing the Prime Mover power to zero or negative (engine drag) and reducing fuel flow to minimum or zero, otherwise known as coasting. Deceleration can also be accomplished by disengaging the Prime Mover (shifting to Neutral or pedaling the clutch, not usually recommended), Regenerative Braking (in hybrid and some other vehicles), or conventional friction braking. Since coasting offers the opportunity to travel at a reduced amount of fuel, it will be discussed next.

Coasting means the vehicle continues its journey at a gradually decreasing speed and at a reduced or zero fuel consumption. In order for the operator to know if coasting is worthwhile, DFC can be defined and calculated for a coasting mode of operation as follows. First, a model of coasting must be defined. Measuring of vehicle coasting characteristics indicates that a first order approximation of coasting at normal operating speed is that the vehicle speed decreases at a constant value for each distance traveled, for example modern vehicles were measured to decrease 6 mph per 0.1 mile traveled. Next, an alternate to coasting is defined as continuing at an initial steady speed and steady speed fuel consumption and then instantaneously friction braking to the current speed. DFC is then defined as the fuel that would be consumed traveling at the initial speed minus the fuel consumed during coasting, divided by the additional time of coasting compared to the initial steady speed. DFC computed in this mode is defined as Fuel or Cost SAVE, that is, fuel that is not consumed by the vehicle by taking advantage of the fuel that was previously consumed to increase the speed and kinetic energy of the vehicle, and using that energy to continue the journey but at a decreasing speed and increasing time. With experience and the assistance of another display, vehicle operators may be able to anticipate decelerations and stops and precede same by coasting as long as Coasting DFC is of sufficient value or in excess of a minimum, and then friction braking to the final desired speed.

DFC during coasting of automobiles can be seen to yield a very large cost savings; for example, coasting from 70 mph can result in a cost savings of over 100 gallons per hour for the first few seconds, another unexpected and valuable result. This number decreases rapidly however, reaching approximately 3 gallons per hour at 40 mph, indicating that coasting may be more worthwhile than generally believed and practiced by most drivers. Operators may discover that coasting for ½ to ¾ mile before braking may be worthwhile from normal highway speeds.

Friction braking represents a lost opportunity to save fuel during deceleration as outlined in Coasting above. Consequently, the same model of coasting and braking applies, and the resulting DFC represents Fuel or Cost LOST instead of SAVE. Operators of vehicles quickly observe that friction braking at high speeds can be very costly, as much or more than 10 to 20 times the Federal Minimum Wage. As a result, considerable fuel and cost may be saved and emissions avoided by anticipating stops and deceleration, and coasting instead of or prior to braking.

Recognizing the potential value or fuel savings of coasting when deceleration or stops of the vehicle can be anticipated, a display of how far the vehicle can coast may be useful. Consequently, an additional parameter can be computed and displayed, called Value Coast Distance, to indicate the distance a vehicle can travel while coasting while DFC exceeds a minimum value threshold.

Operators of vehicles equipped with a DFC display soon discover that operation at typical speed limits of limited access highways is worth their time, for instance compared to Federal Minimum Wage. Operation below the speed where the vehicle achieves minim fuel consumption (gallons per mile) or maximum mileage (miles per gallon) consumes both additional fuel and time, resulting in a negative value of DFC, indicating that both fuel and time can be reduced by traveling faster (but may be necessary for safety or congestion). Acceleration is required to execute a journey, but DFC can be seen to be essentially constant during all rates of acceleration. The most interesting observation may be that coasting is significantly worthwhile under many conditions, with very high DFC and considerable Fuel or Cost SAVE at a small increase in time. Conversely, friction braking is shown to waste considerable energy and Fuel LOST, especially at high speed. Sitting at zero speed while the engine idles and consumes fuel is also Fuel or Cost LOST, since fuel is consumed without transport being provided.

Operators may use the displayed information to decide if current operation is of sufficient value or worth the time of the operator and passengers and cargo. With little experience, operators can learn to operate the vehicle in ways that maximize value, minimize fuel consumption, and reduce or avoid operations that are excessively costly or wasteful. An added benefit may be the avoidance of waste of valuable fossil fuels and the resulting emissions of pollutants and greenhouse gases.

DETAILED DESCRIPTION OF THE INVENTION

This invention resides in apparatus and methods to display information to guide operators of powered vehicles to minimize cost, minimize fuel consumption and waste, minimize the resulting emissions of pollutants and greenhouse gases, and do so in ways that are worth the operator's time. In one aspect, the invention provides a measure that relates the cost of operation of a vehicle to something of prime importance to most people—the value of their time. By providing a display in units that most people can relate to, namely, dollars or other currency per hour, people can compare vehicle operating cost to their wages or some other standard of the value of time such as the Federal Minimum Wage, and use such information to operate in more cost-effective ways.

In accordance with a different aspect, the invention computes and provides information for all important modes of vehicle operation. Conventional vehicles can only operate in four or five different modes; those being: 1) accelerate, 2) operate at a range of steady speeds including zero speed, 3) decelerate by coasting, 4) decelerate by regenerative braking (as with hybrid vehicles), and 5) decelerate by friction braking. The invention determines the mode of operation and provides the operator the calculated operating fuel cost based upon the current mode. Based on the instant cost, the operator can then choose to continue to operate in the current mode or change operation as seen fit and where possible. Operators can quickly observe and learn to avoid actions that are excessively costly or wasteful, and emphasize those that yield suitable cost, time, and fuel savings.

Figure 1:
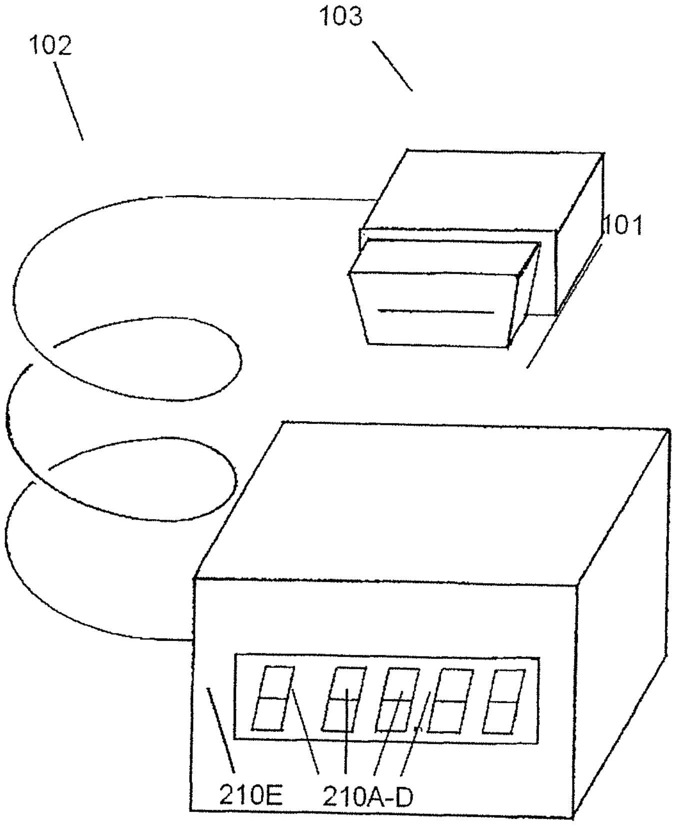
FIG. 1 is a perspective view of a display device according to the invention.

FIG. 1 is a perspective view of a display device according to the invention. Item 101 is a case or enclosure that may be rested on or securely attached to the dashboard of a vehicle such that the display 210 is in clear view of the operator. An electrical cord 102 connects the electronics internal to the enclosure to a special Connector or OBD Plug 103, sized to plug into the OBD jack or receptacle under the vehicle steering wheel on vehicles sold in the US and elsewhere since 1996. The plug and jack are in conformance to SAE (Society of Automotive Engineers) Standard J1962. DC electric power to operate the machine is derived from the OBD bus connection.

Figure 2:
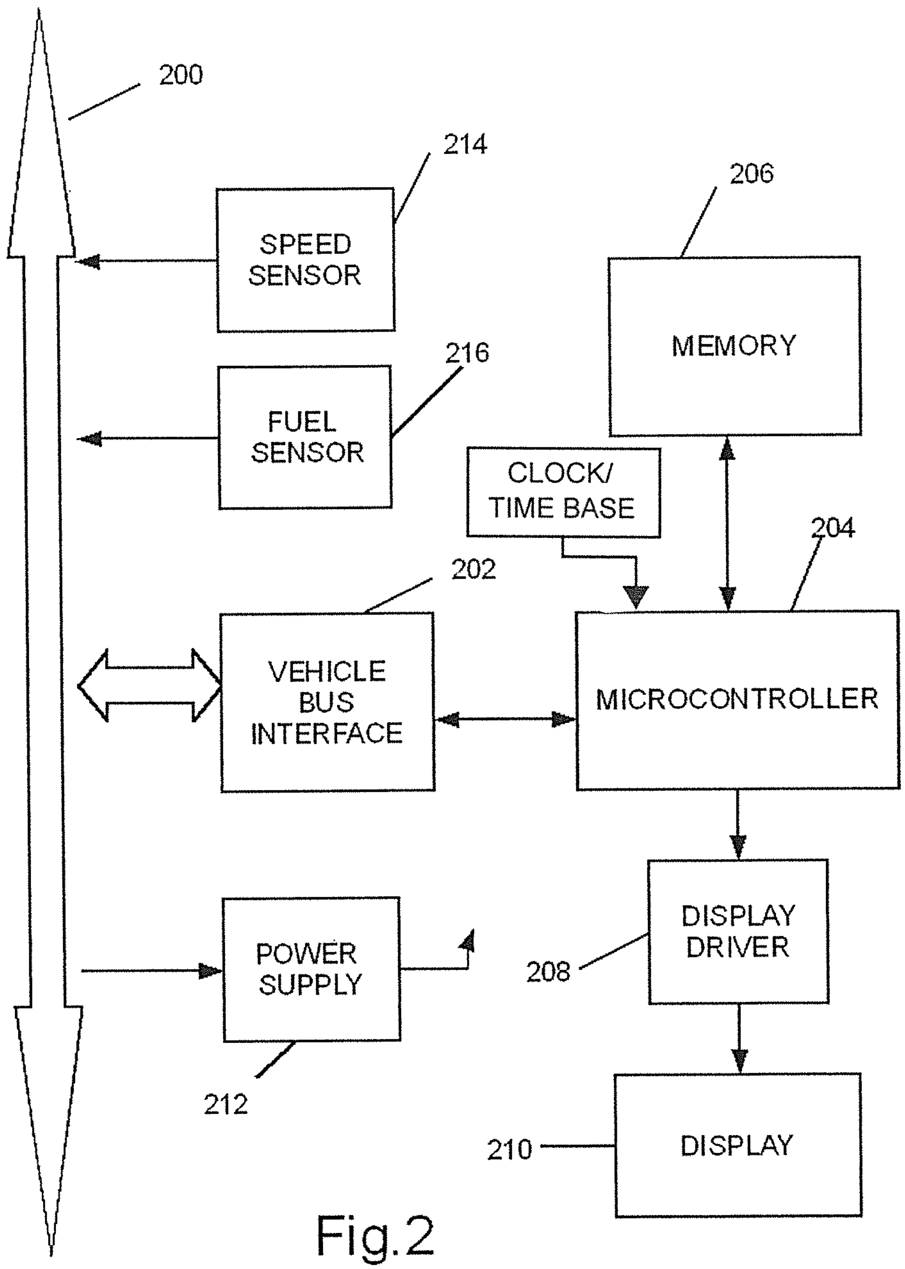
FIG. 2 is a block diagram of the electronic devices associated with the preferred embodiment.
Figure 3A:
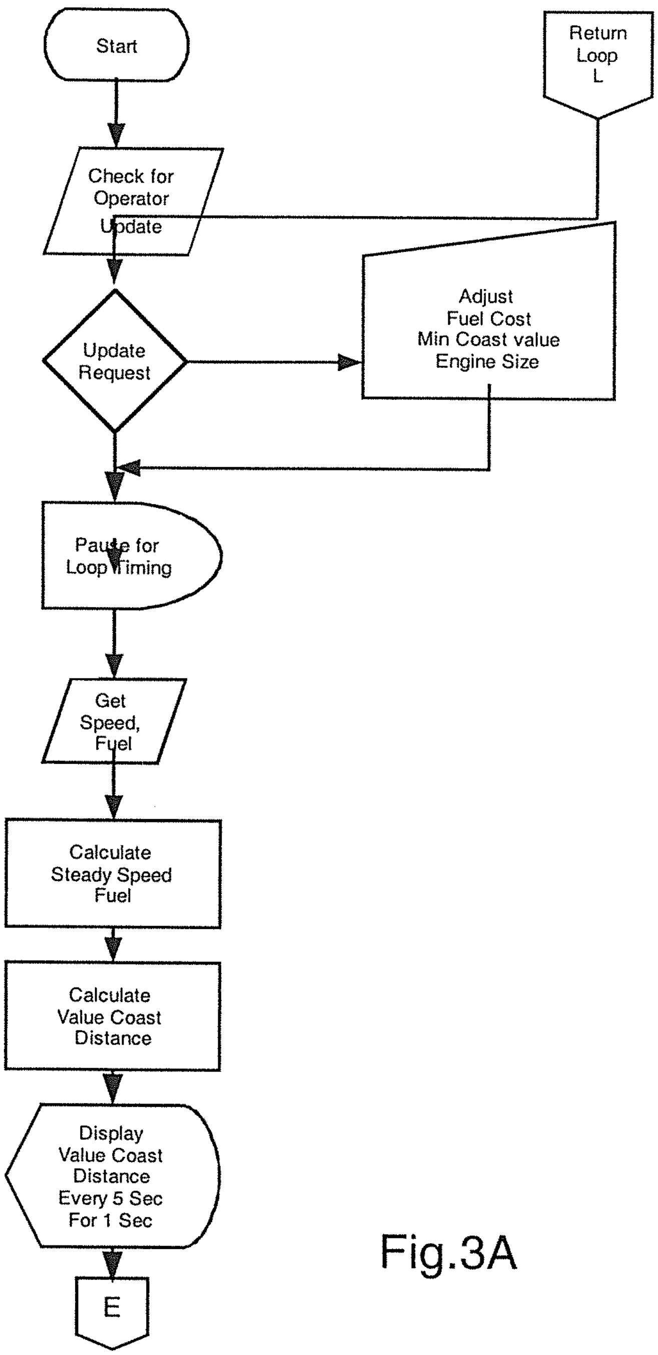
FIGS. 3A-3E depict a flow chart of the program used by the microcontroller shown in FIG. 2.
Figure 3B:
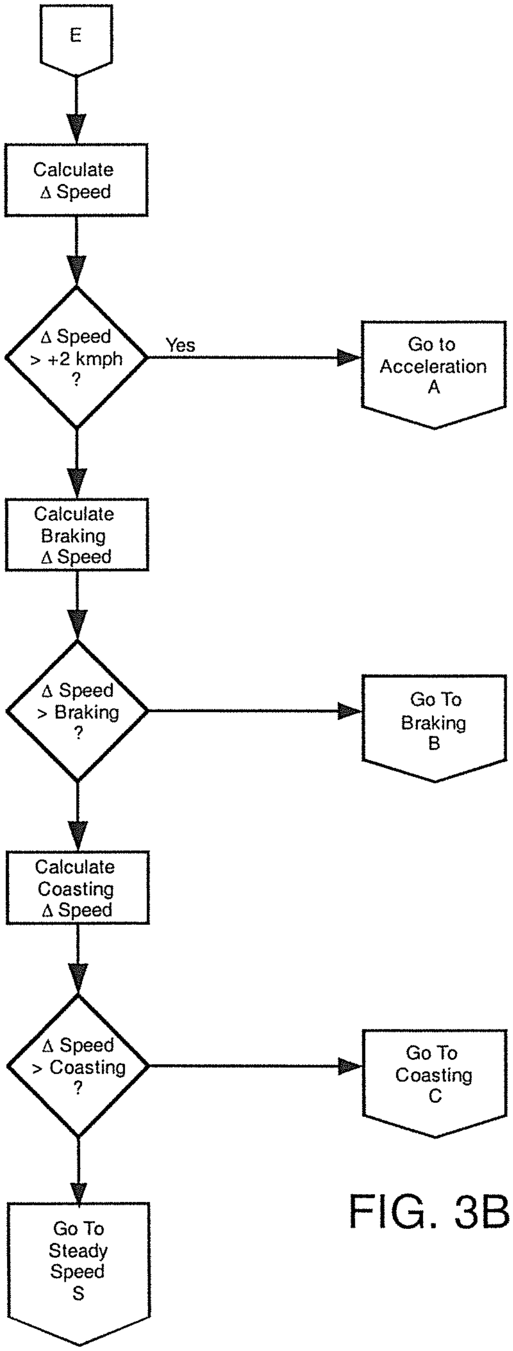
Figure 3C:
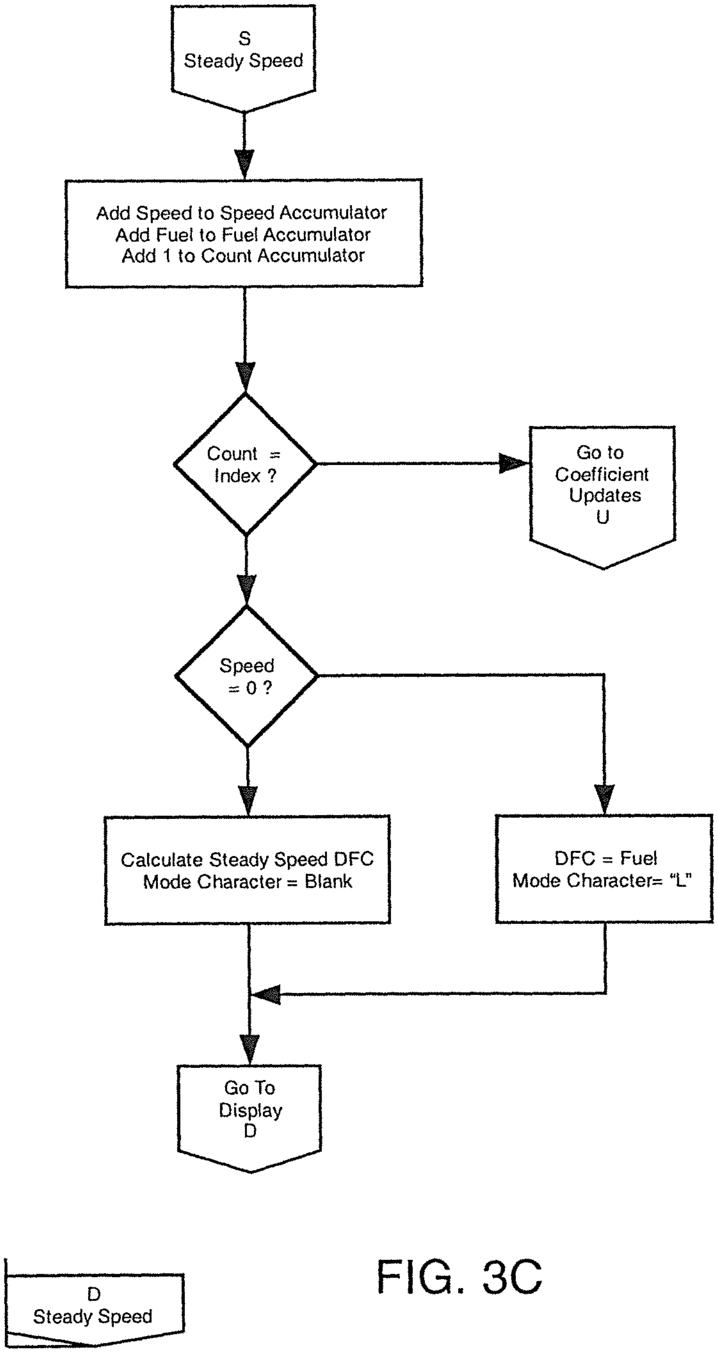
Figure 3D:
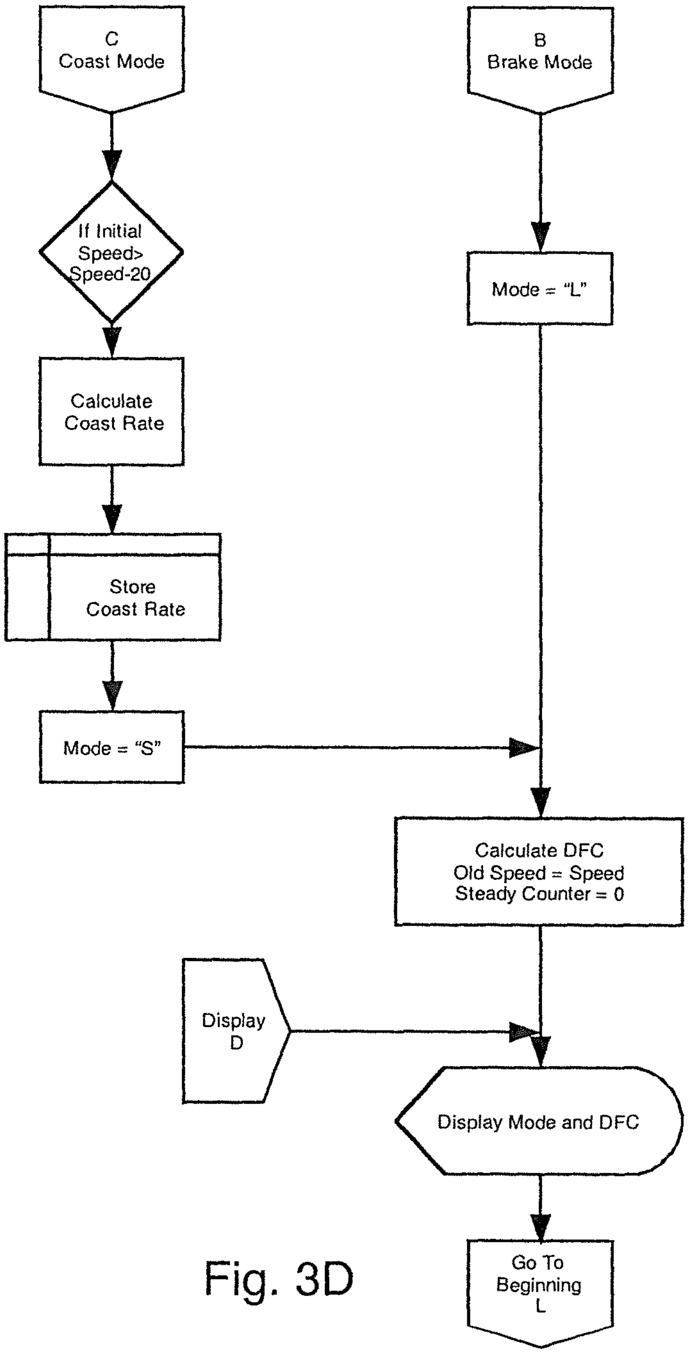
Figure 3E:
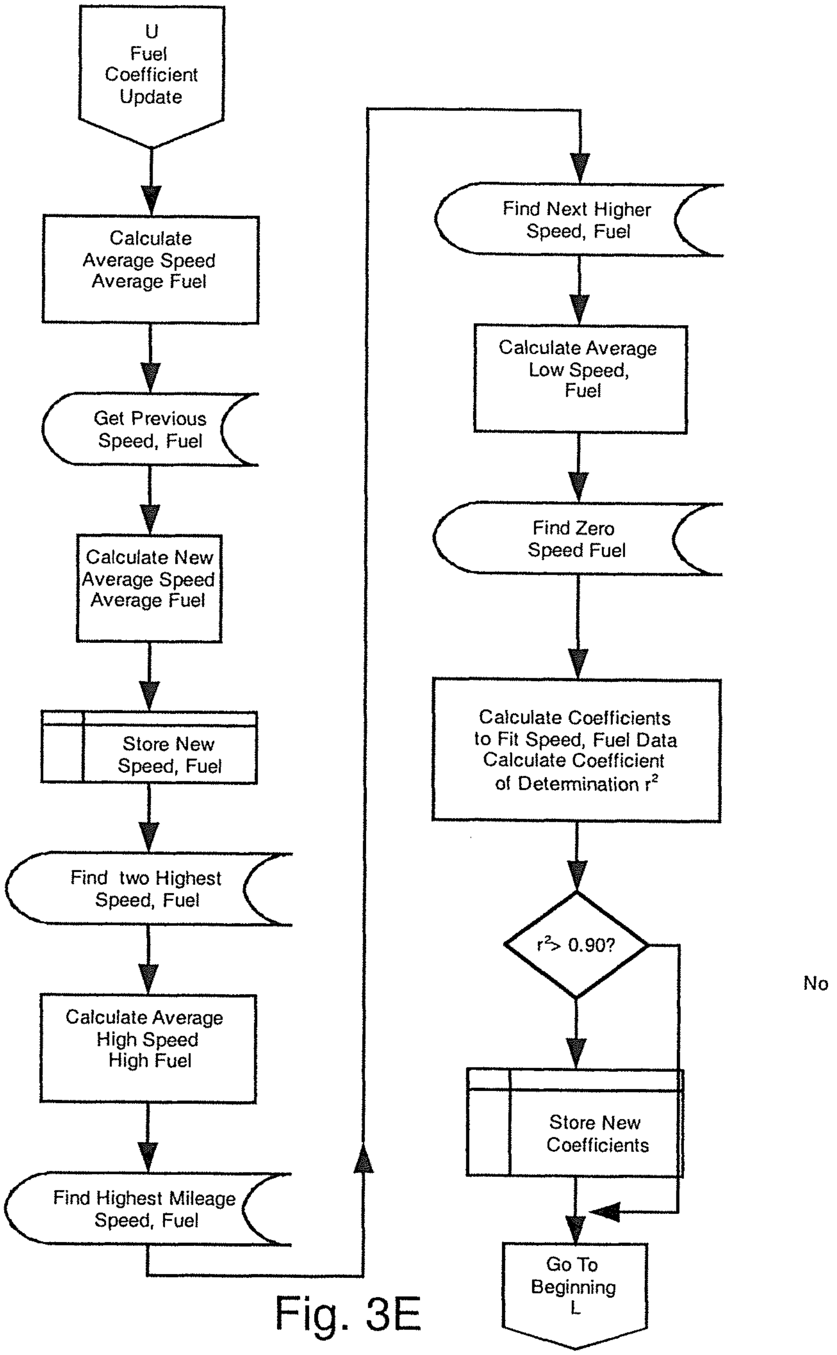

FIG. 2 is a block diagram of the electronics enclosed in the device of FIG. 1. Vehicle sensors such as a speed pickup 214 and fuel sensor 216 supply vehicle data to the Vehicle Bus Item 200. A Vehicle Bus Interface 202 serves as an interface to the vehicle OBD Bus Item 200. OBD-Compliant vehicles use communications protocols defined in SAE Standards J 1850, ISO Standards 9141 and 14230, and CAN (ISO15765/SAE J2480). Elm Electronics of Toronto, Ontario, Canada provides several styles of Vehicle Bus Interface devices to match the various vehicle manufacturer's and SAE Standard OBD bus protocols, such as the ELM 320, 322, and 327. Other suppliers such as ScanTool of Phoenix, Ariz. provide fully-assembled personal computer interfaces using the ELM device. The format of data available from the OBD Bus is defined in SAE Standard J 1979, otherwise known as Parameter Identifiers, or PIDs.

The Vehicle Bus Interface Item 202 communicates to a Microcontroller 204 via a standard IEEE RS232 communications protocol. The Microcontroller 204 may be an 8-bit processor operating at a clock speed of 4 MHz, with 32 Bytes of Random Access Memory (RAM). An applicable device is a Basic Stamp 2 from Parallax Inc of Rockland, Calif., which includes a Microchip PIC 16C57c Microcontroller from MicroChip Electronics of Phoenix, Ariz. Those skilled in the art may utilize a wide range of microprocessors available from many different manufacturers.

The Microcontroller output is supplied to Display Driver Item 208, a MC14489 multi-character LED Display/Lamp Driver manufactured by Motorola Incorporated of Phoenix, Ariz. Memory 206 may comprise 2 Kilobytes of Electronically Erasable Read Only Memory (EEPROM) to store the program and some data. The Display 210 may comprise five (5) seven-segment 0.56" light emitting diode (LED) displays arranged side-by side. Referring back to FIG. 1, the leftmost LED 210E is used for MODE display, and is green; the remaining LEDs 210A through 210D are red, with decimal point between the second and third digit, enabling displays from −9.99 to 99.99 units. A separate 5 VDC regulated power supply 212 is supplied with 12 VDC from the OBD bus connection and supplies 5 VDC to the various devices.

System Operation

The operation of the display unit is under the control of a program stored in EEROM 206, written for the Main Microcontroller 204, with additional functions performed by the OBD Interface 202 and the Display Driver 208. In a continuous loop, the program computes and stores the vehicle steady speed fuel characteristics. The Operating Mode of the Vehicle is detected and, based on the operating mode, Dynamic Fuel Cost is computed and displayed.

A more detailed explanation of the program can be seen in the Program Flow Chart of FIG. 3, and the following description. In the following discussion and graphics, speed is measured in kilometers per hour since those units are provided on the OBD bus. Fuel is measured in gallons as the standard US commercial measure. Time is measured in hours, another standard unit.

The machine computes and provides a display of the current incremental fuel cost of the vehicle in units of fuel per unit of time. This quantity is called Dynamic Fuel Cost, and can be thought of simply as the instant cost to operate the vehicle per hour. Specifically, the system answers the question: "If the vehicle is operated at a faster speed than present, how much additional fuel is consumed per hour of reduced travel time, or if operated at a slower speed than present, how much less fuel is consumed per hour of increased travel time?" Based on the display value, operators can decide if the current mode of operation is worth their time or too costly or wasteful, and learn to operate the vehicle in cost-effective ways, save fuel and reduce waste and emissions, and increase the capacity of the highway network.

Figure 4:
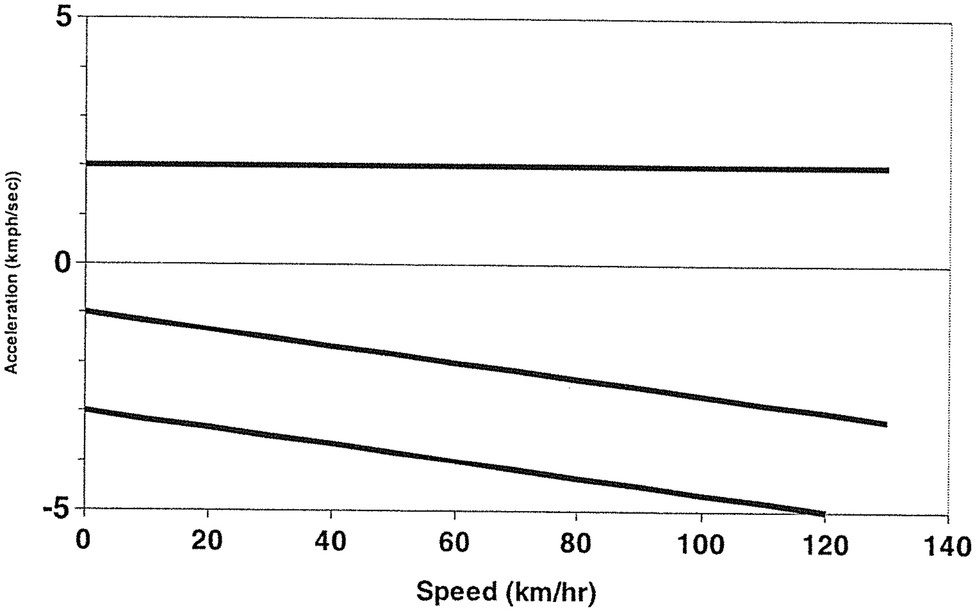
FIG. 4 is a chart showing detection of vehicle operating mode.

In accordance with a different aspect, system detects one of up to six modes of operation of the vehicle and provides a display of fuel cost per hour. The six modes of operation are:

1. steady speed
2. acceleration
3. coasting
4. regenerative braking (when available on hybrid vehicles)
5. friction braking
6. zero speed idling FIG. 4 is a graph that shows the various rates of acceleration/deceleration for a typical vehicle used for detection/decision of the above modes.

When the vehicle is operated at steady speed the Mode display is blank. Steady speed DFC may be a positive or negative number. At speeds below the speed where the vehicle achieves the highest mileage DFC is a negative number, indicating that both fuel consumed and travel time can be reduced by traveling faster. At speeds above the highest mileage speed DFC is positive. The method of computing steady speed DFC is detailed below.

When the machine detects that the vehicle is accelerating, the Mode display indicates "A" for acceleration, and DFC is computed and displayed in a different manor. The "A" indicates to the operator that the vehicle is accelerating, usually because additional fuel is being consumed compared to the fuel required to maintain steady speed. DFC is computed and displayed as the ratio of the additional fuel consumed compared to steady speed operation, per hour of decreased travel time at the present higher speed compared to the lower speed one second earlier. Hybrid vehicles use additional electric or other stored energy to help accelerate the vehicle. Consequently the "fuel equivalent" of the stored energy is included in the fuel being consumed.

When the machine detects that the vehicle is coasting, the mode display indicates "S", or SAVE, indicating that the operator is saving fuel and emissions by utilizing the kinetic energy of the vehicle instead of the prime mover(s). The additional fuel that was used previously to accelerate is now being used to propel the vehicle, but at a decreasing speed. DFC is computed and displayed by first computing the fuel that would be used if the vehicle continued at steady speed and then friction braked, then subtracting actual fuel use. This quantity is then divided by the additional time to coast compared to traveling at an initial steady speed followed by rapid braking.

SAVE is used in the meaning or context of making the steady speed expenditure of fuel unnecessary by using fuel that was previously burned, and avoiding waste of turning that energy to heat by braking. SAVE mode also infers a reduction of the pollutants and greenhouse gases that would result from the burning of fuel in the steady speed mode prior to braking. After a few instances of seeing LOST of friction braking and SAVE of coasting, operators learn to often anticipate stops or slowdowns and take advantage of the fuel and emissions savings offered by coasting. This operation has the added advantage of reducing brake wear and the resulting emissions of brake pad particulate dust, and save additional money by reducing brake replacements.

Coasting in the context of this document is defined as the operator simply lifting off the accelerator pedal or throttle device and reducing the prime mover power to minimum, along with fuel flow. Prime mover drag then assists in slowing the vehicle. Another process similar to coasting is shifting the transmission to Neutral, or disconnecting the prime mover from the drive train, sometimes described as "gliding." Such operation is not considered viable by most operators and may be dangerous or illegal, especially in mountainous regions.

The distance that a vehicle will coast or the rate of speed decay can be a mystery to operators, nor have they traditionally cared. The drag force on the vehicle changes with speed squared due to aerodynamics, so conventional rules or calculations by Newton's Equations of Motion are complex, high-order expressions. In my research, I discovered that coasting in conventional automobiles can be well-approximated by a constant speed decrease over distance. For example, I measured several automobiles to coast at a speed decrease of 6 mph for every 0.1 mile (or 6 kilometers per hour per 0.1 kilometer) that I coasted at normal operating speeds. This simplifies the coasting/braking model considerably and is quite accurate. Consequently, one embodiment of the device is to display to operators just how far the vehicle will coast while DFC is greater than a minimum SAVE value, defined as Value Coast Distance (VCD).

When the system detects that the vehicle is in regenerative braking mode, the mode display also indicates "S" or SAVE, in this case by slowing the vehicle by recovering the kinetic energy and storing it for future use such as in a battery. DFC is computed and displayed by computing the fuel that would be used if the vehicle continued at steady speed and then friction braked, less the fuel equivalent of the energy recovered, divided by the additional time of regenerative braking. Hybrid vehicles offer this additional means of braking that can save time as well as fuel and emissions, especially for unanticipated slowdowns or stops.

When the system detects that the vehicle is in friction braking mode, the mode display indicates "L" or LOSE mode, indicating that the operator is dissipating or wasting the kinetic energy of the vehicle as heat in the friction brakes, missing the opportunity to SAVE. Braking DFC is computed in the same manner as during coasting above. DFC observed when braking at high speed can be a considerable loss, thereby encouraging operators to anticipate stops and coast and SAVE more. By implication, LOSE also infers a missed opportunity to reduce emissions and save fuel. There are times when braking cannot be avoided, such as congestion, traffic lights that turn yellow or red, the vehicle ahead slows unexpectedly, etc.

The first function of the microprocessor is to obtain the speed of the vehicle and engine data and compute the vehicle fuel flow once every second. The speed of the vehicle is then compared to the speed from the previous query one second earlier, and by subtraction determine if the vehicle is accelerating, braking, decelerating at a normal coast, or traveling at a steady speed. DFC at the specific speed and operating condition is then computed by the microprocessor and forwarded to the display at one second intervals.

Another function of the microprocessor is to compile the steady-speed fuel consumption characteristics of the vehicle for use in computing DFC. If the vehicle is sensed to be traveling at a steady speed, the vehicle is queried to determine if the engine coolant is at normal operating temperature and emissions controls are operating normally. If so, the speed and fuel flow is averaged over a period of 30 to 120 seconds. This new data is then averaged with previous data and saved in a data table in speed increments of 5 mph (8 kph). A revised mathematic expression of fuel flow versus speed is then calculated.

One method for the mathematics of computation of steady speed fuel and DFC is explained in the following steps. In general, the drag forces of vehicles of vehicles moving at constant speed consist of two components, first rolling resistance, and second, aerodynamic drag. Rolling resistance typically is relatively constant over the speed range of most vehicles. Aerodynamic drag is a squared function of air speed, almost negligible at low speed, but becoming very significant for most vehicles at high speed. Thus:

$$\text{Drag Force}=\text{Rolling Resistance}+\text{airspeed}^2*\text{aerodynamic drag constant}$$

By definition, the power to propel a vehicle on a level roadway at constant speed is equal to speed times force, or:

$$\text{Power}=\text{groundspeed}*(\text{rolling resistance}+\text{airspeed}^2*\text{aerodynamic drag constant})$$

The airspeed of the vehicle is equal to the groundspeed plus the local wind speed, which can be either a headwind or tailwind. Since the wind speed is unknown and can vary widely, power can simply be calculated based on ground speed, updated as conditions change. However, it can be seen that wind can have a significant effect on fuel consumption, either positive or negative.

For typical Prime Movers such as gasoline Otto or Diesel engines or electric motors, the fuel or energy consumption rate can be well approximated to a first order by a "Willans Line," or a first constant times the power output plus a second constant. Combining this expression with the previous expression for Power, the fuel flow rate in units of quantity/time of a vehicle at constant speed can be expressed by a $3^{rd}$ order, 4 term polynomial to a very high accuracy (Correlation Coefficients of 0.95 and higher), by the expression:

$$\text{Fuel Flow Rate(gallons/hour)}=a_3*\text{speed}^3+a_2*\text{speed}^2+a_1*\text{speed}+a_0$$

FIG. 4 provides some examples of Fuel Flow Rate versus speed for several typical vehicles.

The coefficients $a_3$ through $a_0$ are developed by standard statistical curve-fitting techniques of least-squares regression, or selecting four points along the curve and solving four equations with four unknowns using Algebra. For many vehicles, $a_2$ is found to be zero, simplifying the calculation. Steady Speed Level Road Fuel Gallonage (gallons per mile or liters per kilometer) can then be computed per unit of distance such as miles or kilometers by dividing by speed;

$$\text{Fuel(gallons/mile)}=\text{Fuel(gallons/hour)}/(\text{mi/hr})=a_3*\text{speed}^2+a_2*\text{speed}+a_1+a_0/\text{speed}$$

Travel time (T, tau) in hours per mile is related to speed by the inverse relationship speed=1/T, thus:

$$\text{Fuel Gallonage(gal/mile)}=a_3/T^2-a_2/T^1+a_1+a_0*T$$

To find the rate of change in Gallonage for a change in Travel Time (T), we take the first derivative of Gallonage with respect to T (travel time, hrs/mi) as:

$$dF/dT=-2*a_3*T^{-3}-a_2*T^{-2}+0+a_0$$

This quantity is defined as the ratio of the change in fuel (F) for a small change in travel time T for any value of T.

Defining Dynamic Fuel Cost (DFC) as −dF/dT, and replacing T with "S" for Speed, steady speed DFC can be formulated as:

$$\text{DFC}=2*a_3*S^3+a_2*S^2-a_0$$

Figure 5:
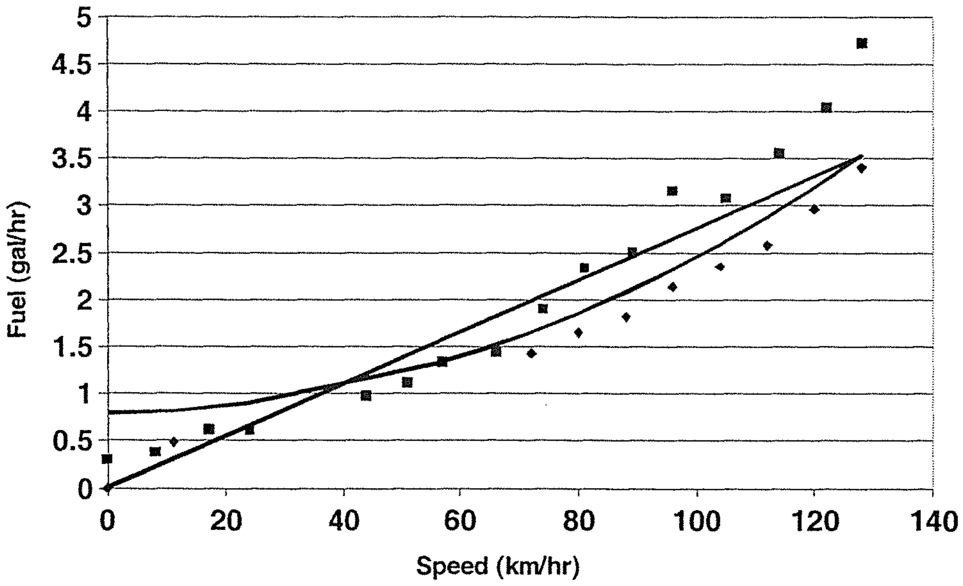
FIG. 5 is a chart of speed versus fuel flow rate for a modern crossover utility vehicle.
Figure 6:
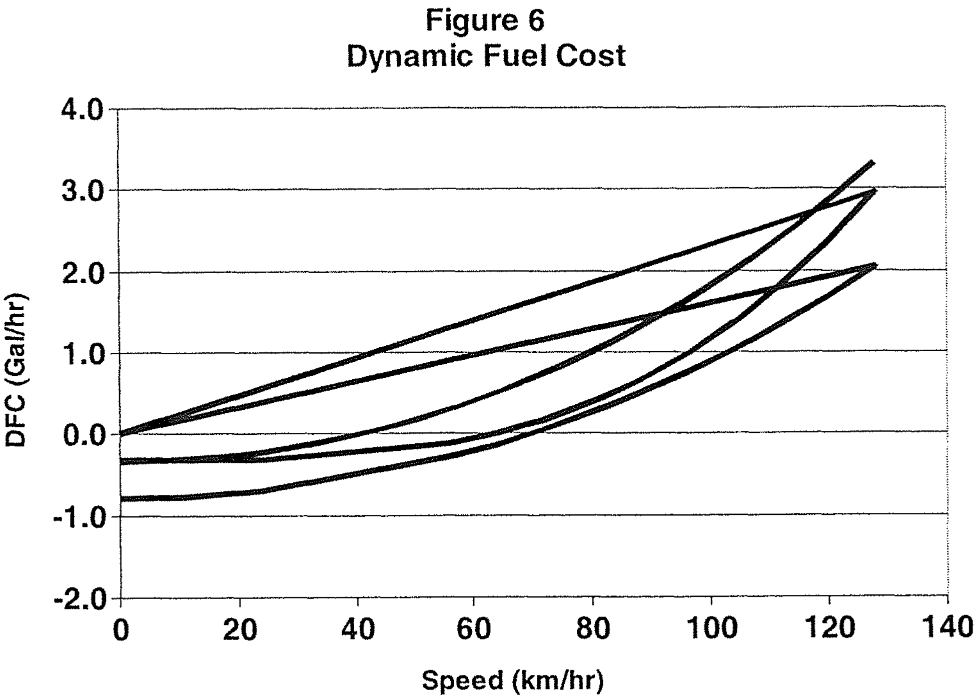
FIG. 6 is a chart of Speed versus Dynamic Fuel Cost for the several vehicles.

DFC in gallons of fuel per hour as a function of speed for a modern crossover utility vehicle is shown in FIG. 5.

DFC is then multiplied by the price of fuel in dollars per gallon to arrive at DFC expressed in dollars per hour. Steady speed DFC is readily computed by a microprocessor or microcontroller at one second or other intervals and displayed by a standard electronic display such as Light Emitting Diodes (LEDs), Liquid Crystal Displays (LCDs), conventional analog indicating meters, etc.

The price of fuel in dollars per gallon or Euros per liter is stored in the memory 206, and is able to be updated by the vehicle operator via pushbuttons.

Additional Capabilities

In addition to information described above, the display may also show the distance the vehicle can coast at current speed whereby the fuel SAVE is in excess of an operator-specified value, defined as Value Coast Distance (VCD). This display becomes a constant reminder to operators of the value of anticipating stops.

Note that the calculations and display of DFC, VCD or other parameters may be provided within a factory-installed "trip computer" or driver information display, rather than an add-on or aftermarket device as described previously.

A simple calibration of a vehicle speedometer may be used to read DFC in gallons or liters per hour instead of speed in miles per hour or kilometers per hour. Based on test measurements of steady speed fuel consumption and following the mathematics outlined above, the display is scaled to display DFC for the specific vehicle as shown in FIG. 5. Since speedometers are standard equipment on most vehicles the per-unit cost is essentially zero. Such a device would not offer the complete multi-mode display of the main embodiment, nor be adjustable to reflect fuel price.

The system may be based on analog electronics instead of digital signals and devices. A voltage or current or other signal may be derived from a vehicle speed sensor. This signal is input to an operational amplifier configured as a non-linear function generator, typically using diodes in a feedback loop. The device is calibrated to develop an output representative of the DFC versus speed curve shown in FIG. 5. The output of the non-linear function generator drives a display calibrated to indicate DFC in the selected units. One skilled in the art would be able to design such a device and provide the multi-mode display of the digital version. Such a device may cost similarly to or more than the main embodiment, so it offers no real advantage.

Additional inputs may be desirable with hybrid gas-electric vehicles, some of which may outside the scope of the OBD bus standard. Steady speed operation is unaffected, although some additional fuel may be consumed on occasion to recharge or maintain the battery. The fuel consumed during acceleration may include the "fuel equivalent" of the electric power used by the propulsion motor(s). The detection of deceleration mode in a hybrid vehicle is more complex due to the inclusion of dynamic braking. The boundary between dynamic braking and friction braking is vehicle-specific, and may not be detectable by rate of deceleration alone. Consequently, implementation of the embodiment in a hybrid vehicle is more complex, but available to one skilled in information and control systems within each such vehicle.

"Wireless" data transfer may be used between the OBD Bus or data sensors and the final computing and display device. This would free the dashboard of the vehicle from connecting wires. A "Smart Phone" such as a hand-held cellular telephone and computing device similar to IPhone produced by Apple of Cupertino, Calif., may be used for the computing and display device. A small cradle would hold the device within the operator's view.

Advantages

Contrary to classic "expert opinion," operators of vehicles equipped with the inveniton quickly discover that the cost of fuel to accelerate is essentially independent of the rate of acceleration, so accelerating slowly has no value in many cases. Accelerating at higher than normal rates has the advantage of increasing the vehicle flow through intersections controlled by traffic signals; thus, more cars make the green. Widespread use of the device and techniques disclosed herein should lead to an increase in capacity of roadways, less time spent idling, and less fuel and emissions.

An interesting result of using the device is the observation of a high value of fuel SAVE by coasting instead of, or before, braking, especially at higher speeds. For instance, during the first few seconds of coasting, the savings rate can be 20 to 50 gallons or more of fuel per hour, a very significant and worthwhile amount to most people at the current cost of fuel. During coasting, the additional fuel that was previously used to accelerate is used to propel the vehicle but at a decreasing speed, hence additional time. SAVE is used in the meaning or context of reducing the expenditure of fuel compared to the alternative of braking, or avoiding waste. After a few instances of seeing the LOSE resulting from friction braking (below) and the SAVE of coasting, operators can learn to often anticipate stops or slowdowns and take advantage of the fuel and emissions savings offered by coasting. This operation has the added advantage of reducing brake wear and the resulting emissions of brake pad particulate dust, and SAVE additional money by reducing brake replacements.

Another embodiment of the machine is a display of the distance the vehicle can coast at current speed whereby the fuel SAVE is in excess of an operator-specified value. The advantages of this embodiment should be apparent; it shortens the learning process of the potential value and savings of coasting, and is a constant reminder to all operators of the value of planning ahead and anticipating stops.

Hybrid vehicles with the capability for regenerative braking offer an additional means to SAVE fuel by regenerative braking in addition to simple coasting. During regenerative braking the kinetic energy of the vehicle is recovered, for example used to charge a battery in electric hybrids. Accordingly some of the kinetic energy of motion is available for the next acceleration of the vehicle. Regenerative braking saves time by allowing the vehicle operator to continue travel at an initial steady speed for a longer distance followed by faster deceleration than simple coasting, thus saving travel time without wasting energy. Consequently dynamic braking is a valuable energy and time-saving option.

The third interesting and unexpected discovery of this machine is the potential high cost of friction braking instead of coasting. The alternative to coasting for most vehicles is friction braking, turning the kinetic energy of acceleration to heat and brake pad dust. The reference machine also displays the fuel cost of this choice to the operator in a similar manor to above. In other words, instead of SAVE fuel and money by coasting, friction braking is shown by the display of the device to LOSE valuable fuel and money, operators quickly learn that while braking may save time, it may also be costly compared to the alternative of coasting.

Use of the invention reveals that driving slower than an optimum speed may not be of significant value to vehicle operators. The traditional advice for saving fuel has been among other things, to drive slower, but the question has always been, "how much slower?" With the invention, operation below the speed where the vehicle achieves highest mileage (sometimes called the "sweet spot," typically 30 to 50 mph for automobiles), results in display of LOSE and DFC, indicating that both travel time and fuel cost can be reduced by traveling faster. However, such speeds may be necessary for safety or road and traffic conditions. Based on the information provided by the device, operators may choose to minimize time spent at sub-optimum speeds, reducing both fuel consumption and emissions and their time.

Operators interested in obtaining the very highest steady speed mileage obtainable with a given vehicle and save the earth can simply drive at the "sweet spot," the speed where the display indicates DFC is zero. This operating point is not readily ascertainable on conventional mileage meters, but is easily seen by virtue of the invention. It turns out that driving typical vehicles at typical legal speed limits is very affordable for most people. Results also indicate that traveling at 55 mph (the National Speed Limit from 1974 to approximately 1994) may be judged by most individuals to be a waste of time. The DFC for typical autos at 55 mph is about of about 1 gallon per hour, or approximately ⅓ of the Federal Minimum Wage. The current typical speed limit of 70 mph on limited access highways results in a DFC for typical automobiles of about 2 to 3 gallons per hour, comparable to the Federal Minimum Wage. Clearly, today's legal highway speed limits are affordable for most drivers, and higher speeds may be desirable for some. The risk of property damage, injury and death may be a function of speed, so drivers should consider such risk in their speed decisions.

I claim:

1. A system providing information to improve the efficiency of operating a vehicle, comprising:

an interface to a vehicle bus providing vehicle speed and fuel flow rate information;

a real-time clock;

an input to receive fuel price information;

a processor in communication with the clock, the interface and the input, the processor being operative to compute the incremental cost of fuel relative to travel time; and a display for displaying the incremental cost as dynamic fuel cost (DFC), defined as the cost to operate the vehicle in dollars per hour or other currency as a function of time.

2. The system of claim 1, wherein DFC is computed as the first derivative of the fuel flow rate as a function of travel time.

3. The system of claim 1, wherein:

at predetermined time intervals, the processor is further operative to determine the operational mode of the vehicle; and DFC is displayed as a function of the operational mode.

4. The system of claim 1 wherein, at predetermined time intervals, the processor is further operative to determine changes in vehicle speed due to the following modes of operation:

steady speed, acceleration, deceleration by coasting (or regenerative braking in vehicles so equipped), friction braking, and zero speed idling; and wherein DFC is displayed in conjunction with the operational mode.

5. The system of claim 1, further including a memory for storing fuel flow at a plurality of steady speeds over the operating range of the vehicle; and wherein:
 the processor is further operative to calculate fuel flow at any steady speed of the vehicle;
 DFC is derived as the ratio of the change in fuel for a small change in travel time at any speed.

6. The system of claim 1, wherein, at speeds above the most fuel-efficient speed of the vehicle, DFC is calculated to be a positive number.

7. The system of claim 1, wherein, at speeds below the most fuel-efficient speed of the vehicle, including zero speed, DFC is calculated to be a negative number.

8. The system of claim 1, wherein:
 the processor is further operative to determine if the vehicle is accelerating;
 the fuel consumption rate of the vehicle at steady speed is computed; and
 DFC is computed as the ratio of the fuel consumed in excess of steady speed fuel, divided by the reduced travel time of the higher speed.

9. The system of claim 1, wherein:
 the processor is further operative to determine if the vehicle is coasting or regenerative braking; and
 DFC is computed by calculating the fuel required to continue travel at an initial steady speed less the actual fuel, divided by the additional time of coasting instead of steady speed plus braking.

10. The system of claim 1, wherein:
 the processor is further operative to determine if the vehicle is braking; and
 DFC is computed by calculating the fuel consumed by travel at an initial steady speed less actual fuel, divided by the additional time that coasting would have required instead of steady speed travel plus braking, similar to coasting.

11. The system of claim 1, contained in an enclosure adapted for installation on or under a dashboard.

12. A method of providing information to improve the efficiency of operating a vehicle, comprising:
 receiving vehicle speed and fuel flow rate information from a vehicle bus;
 receive fuel price information from a user;
 computing, by a processor, the incremental cost of fuel relative to travel time based upon the vehicle speed, fuel cost and flow rate; and
 displaying the incremental cost as dynamic fuel cost (DFC), defined as the cost to operate the vehicle in dollars per hour or other currency as a function of time.

13. The method of claim 12, including the step of computing DFC as the first derivative of the fuel flow rate as a function of travel time.

14. The method of claim 12, further including the steps of:
 determining the operational mode of the vehicle at predetermined time intervals; and
 displaying DFC as a function of the operational mode.

15. The method of claim 12, further including the steps of:
 determining, at predetermined time intervals, changes in vehicle speed resulting from the following modes of operation:
  steady speed,
  acceleration,
  deceleration by coasting (or regenerative braking in vehicles so equipped),
  friction braking, or
  zero speed idling; and
 displaying DFC in conjunction with the operational mode.

16. The method of claim 12, further including the steps of:
 storing fuel flow at a plurality of steady speeds over the operating range of the vehicle; and wherein:
 calculating fuel flow at any steady speed of the vehicle;
 deriving DFC as the ratio of the change in fuel for a small change in travel time at any speed.

17. The method of claim 12, wherein, at speeds above the most fuel-efficient speed of the vehicle, DFC is calculated to be a positive number.

18. The method of claim 12, wherein, at speeds below the most fuel-efficient speed of the vehicle, including zero speed, DFC is calculated to be a negative number.

19. The method of claim 12, further including the steps of:
 determining if the vehicle is accelerating;
 computing the fuel consumption rate of the vehicle at steady speed; and
 computing DFC as the ratio of the fuel consumed in excess of steady speed fuel, divided by the reduced travel time of the higher speed.

20. The method of claim 12, further including the steps of:
 determining if the vehicle is coasting or regenerative braking; and
 computing DFC by calculating the fuel required to continue travel at an initial steady speed less the actual fuel, divided by the additional time of coasting instead of steady speed plus braking.

21. The method of claim 12, further including the steps of:
 determining if the vehicle is braking; and
 computing DFC by calculating the fuel consumed by travel at an initial steady speed less actual fuel, divided by the additional time that coasting would have required instead of steady speed travel plus braking, similar to coasting.

* * * * *